United States Patent [19]
Whyte

[11] 3,948,374
[45] Apr. 6, 1976

[54] CLUTCHES

[75] Inventor: Alan Malcolm Whyte, Hitchin, England

[73] Assignee: Xerox Corporation, Stamford, Conn.

[22] Filed: July 16, 1974

[21] Appl. No.: 489,794

[30] Foreign Application Priority Data
Dec. 21, 1973 United Kingdom............... 59525/73

[52] U.S. Cl. ..................... 193/33; 74/125.5; 192/28
[51] Int. Cl.² ......................................... F16D 13/04
[58] Field of Search ............ 192/33, 28, 102; 74/82, 74/125.5, 37

[56] References Cited
UNITED STATES PATENTS

| | | | |
|---|---|---|---|
| 3,055,222 | 9/1962 | DuBois et al. ..................... | 192/33 R |
| 3,192,319 | 6/1965 | Murphy ............................. | 74/125.5 |
| 3,435,692 | 4/1969 | Costa et al......................... | 74/125.5 |
| 3,581,856 | 6/1971 | Fleckenstein ..................... | 192/33 R |
| 3,703,948 | 11/1972 | Mack ................................ | 192/33 R |
| 3,804,010 | 4/1974 | Zeuthen........................... | 192/33 R |

*Primary Examiner*—Samuel Scott
*Assistant Examiner*—Randall Heald
*Attorney, Agent, or Firm*—Earl T. Reichert

[57] ABSTRACT

A reproduction machine having a document scanning system has an improved recycling clutch for operating the system. The clutch has a rotatable input plate and a rotatable output plate. An annular pawl plate pivotally mounted on the input plate has a driving surface which is biased into engagement with a pin on the output plate. A rotatable timing element driven by the input plate periodically contacts a cam surface on the outer periphery of the pawl plate to disengage the driving surface from the pin to effect release of the clutch at intervals greater than a revolution of the input plate. The cam surface maintains the disengagement of the driving surface from the output plate for a sufficient length of time to permit rotation of the latter in the reverse direction greater than one revolution via a biasing spring.

5 Claims, 6 Drawing Figures

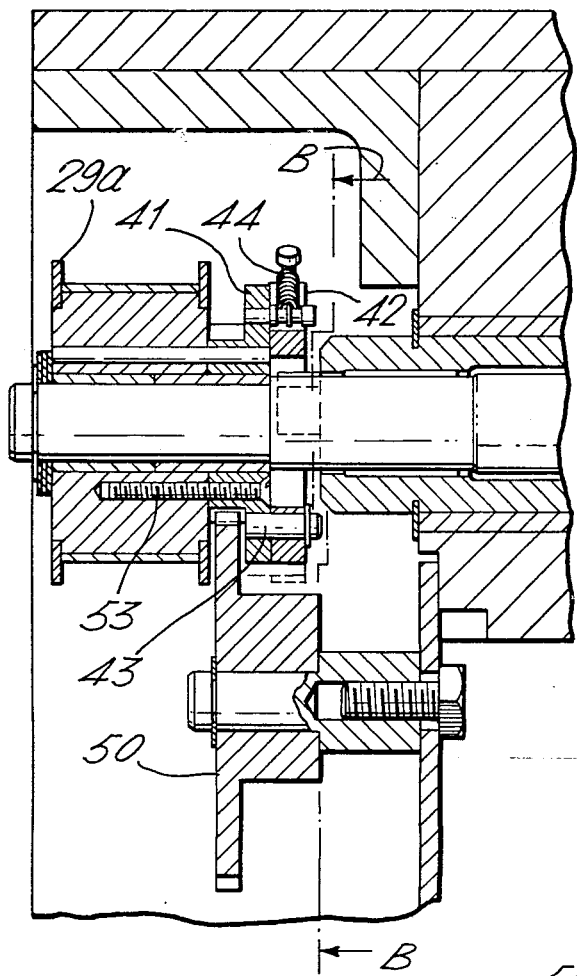
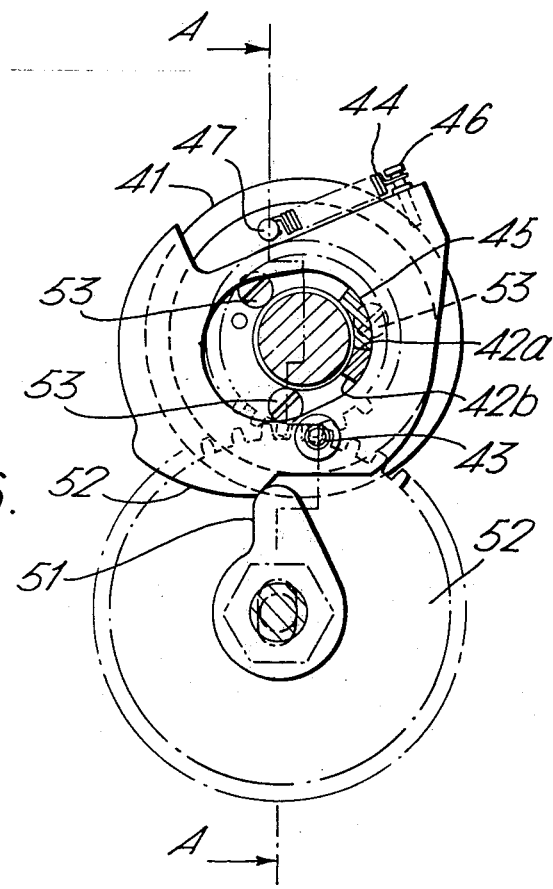
Fig.5.
Fig.6.

CLUTCHES

BACKGROUND OF THE INVENTION

This invention relates to clutches, particularly for use in controlling the movement of a carriage, and to drive systems incorporating such clutches.

Drive systems are known in which, during operation, a driven element energizes a biasing means as it is driven in one direction from a rest position, and a clutch automatically disengages the drive after a predetermined movement of the driven element whereby the latter is returned to its rest position under the influence of the biasing means. The present invention is particularly concerned with clutches suitable for performing such automatic disengagement of the drive which are hereinafter and in the claims referred to as "recycling clutches".

One application of such a clutch is to be found in a photocopying machine such as an electrostatographic reproduction machine as described in British Patent Specification No. 995,413 which includes lamps for exposing successive portions of the document to be copied to a photosensitive surface. These lamps which are carried on a carriage are scanned slowly across the document and are then quickly returned to their initial (start-of-scan) positions, at the end of the scanning stroke. Normally the carriage is driven in one direction by means of a cable connected to the main drive of the machine through a clutch, and is returned under the influence of a spring when the clutch is disengaged.

Scanning mirror systems for use in electrostatographic copying machines have also been proposed in which a carriage carries one or more mirrors by which images of the successive portions of the document to be copied are directed onto a photosensitive surface. Normally the light is directed onto the photosensitive surface through a fixed aperture and the photosensitive surface is arranged to move past the aperture during exposure of the document. With such an arrangement it is essential that the movement of the carriage be synchronized with the movement of the photosensitive surface which is usually in the form of a drum.

Conveniently such a carriage is driven by means of a cable passing around a capstan mounted on a drive shaft and one suitable clutch comprises rotatably input and output elemtns of which the output element carries a pawl which is normally engaged by a dog on the input element. The input element is continuously driven, the pawl being released by engaging a fixed stop member once during each revolution of the clutch whereby the carriage may be returned to its start-of-scan position under the influence of a spring, the output element of the clutch rotating in the reverse direction for slightly less than one revolution when it is again picked up by the dog on the still rotating input element. With such an arrangement in order to ensure that the movement of the carriage is synchronized with that of the photoreceptor, the capstan must be of the same size as the photoreceptor drum, and rotate at the same speed as the drum. This is generally convenient where the capstan can be mounted on the axis of the photoreceptor but particularly where it is desired to arrange the capstan in a different location, space requirements may make a capstan of these proportions inconvenient.

If the capstan is to be of reduced size yet drive the carriage synchronously with the photoreceptor it must rotate faster than the photoreceptor and through more than a single revolution for each scanning movement of the carriage. One way of achieving this is an arrangement in which the drive to an optics carriage drive shaft of an electrostatographic reproduction machine is transmitted via a timing pulley rotatably mounted on a driven shaft arranged parallel to the optics drive shaft. (The capstan is fixed on the optics drive shaft.) A cable drive connects this pulley with a pulley on the optics drive shaft. Secured on the driven shaft is a pawl plate and a pawl is pivotally mounted on the timing pulley about an axis disposed radially beyond the periphery of the pawl plate. The pawl normally engages a notch in the pawl to complete the drive to the optics drive shaft. A fixed (but adjustable) pawl knock-out plate disengages the pawl plate from the notch in the pawl plate once in each driving revolution of the pulley so permitting the optics drive shaft to rotate in reverse direction under the influence of a spring connected to the capstan to return the carriage to the start-of-scan position. More than one revolution of the optics drive shaft is achieved by making the diameter of the timing pulley a whole number multiple of the diameter of the pulley on the optics drive shaft.

With the arrangement described above, the drive is transmitted through the timing element (pulley). A recycling clutch may be provided which has the above described advantages and at the same time permits the drive to be transmitted directly to the optics drive shaft without the timing element being directly loaded.

To that end, there is described and claimed in that application a recycling clutch comprising rotatable input and output elements, cooperating drive engagement means on said elements, respectively, one of which is pivotally mounted on its associated element and biased for engagement with the engagement means on the other element, a rotatable timing element adapted to be driven by said input element and arranged to come into engagement with said pivotally mounted engagement means to effect release of the clutch at intervals greater than a revolution of said input element, and means for maintaining said engagement means disengaged for a sufficient length of time to permit rotation of the output element in reverse direction under the influence of a biasing means through greater than one revolution.

In the system described above, the timing element carries the pawl and forms part of the clutch assembly. The pawl plate rotates once for each scanning movement of the carriage. This means that it is sufficient merely to knock the pawl out of the notch in the plate and allow it to ride around the periphery of the pawl plate until it drops back into the notch, after slightly less than one revolution of the timing pulley (since the pawl plate is still rotating). Stated another way, the output element of the clutch rotates (in one direction) through slightly less than one revolution during scanning and also in (reverse direction) during rescan. However, removing the timing element from the direct drive to the carriage drive shaft requires that like the capstan the output element of the clutch shall rotate through greater than a revolution during scanning and rescan. It is not sufficient in this circumstance merely to effect release of the clutch since then it would become re-engaged before rescan had been completed. This problem is solved in a clutch according to our aforesaid concurrently filed application by the provision of means for maintaining the clutch disengaged during a sufficient operational interval of time to permit the required rotation.

In a clutch as described in that application, the pivotally mounted drive engagement means suitably takes the form of a pawl mounted on the input element and biased drivingly to engage a stop or surface on the output element and it is proposed that the clutch be maintained disengaged for the required operational interval of time by the pawl engaging a ramp or cam surface.

SUMMARY OF THE INVENTION

The present invention is concerned with improvements in and modifications of that invention in which the clutch is maintained disengaged by said pivotally mounted drive engagement means having a cam surface engageable by the timing element.

The pivotally mounted engagement means suitably takes the form of a pawl having an extension or tail defining the cam surface engaged by the timing element, in which case the pawl may be annular in form.

The timing element may comprise a gear driven by a gear fixed against rotation with respect to the input element and including stop means adapted to engage the pawl once in each N revolution where the ratio of the diameters of the gears is N:1.

The invention also provides a carriage drive assembly incorporating a recycling clutch as described above.

And from another aspect, the invention provides a photocopying machine having a document scanning system incorporating such a recycling clutch.

BRIEF DESCRIPTION OF THE DRAWINGS

FIG. 5 is a section through another embodiment of clutch according to this invention taken along the line A—A of FIG. 6.

FIG. 6 is a section along the line B—B of FIG. 5.

DETAILED DESCRIPTION OF THE INVENTION

Figure 1:
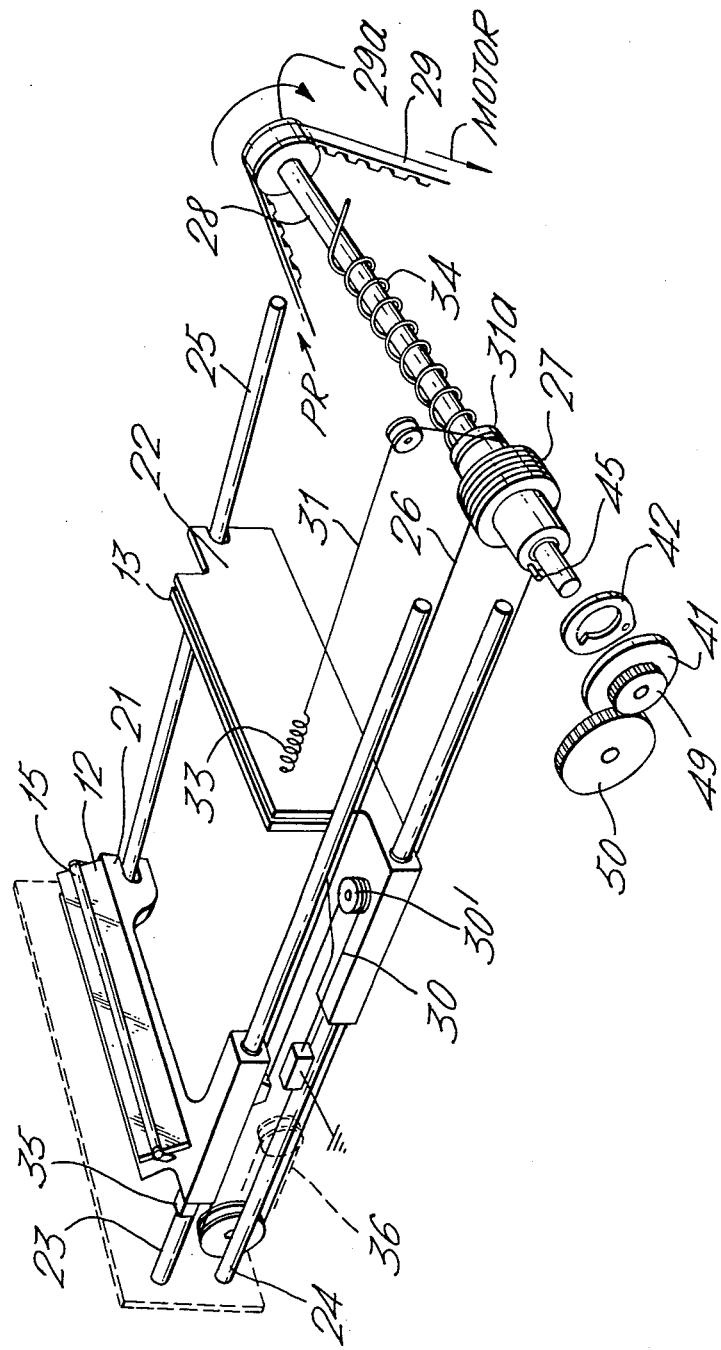
FIG. 1 shows schematically an embodiment of carriage drive assembly of a document scanning system of an electrostatographic reproduction machine in accordance with the present invention.

Referring to FIG. 1 there is shown a carriage drive assembly according to the invention applied to the document scanning system of an electrostatographic machine.

In the practice of electrostatography, various procedures may be followed. By way of illustration an electrostatographic image may be formed on a surface comprising a layer of photoconductive insulating material affixed to a conductive backing which is electrically charged uniformly to render it photosensitive, is then exposed to light from a given image so that an electrostatic latent image is formed thereon in accordance with the light image cast thereon, and finally is caused to be approached by a developer material, which may be fine colored particles carrying electric charge (referred to as toner), or it may be in liquid form, so that the developer material is attracted selectively to the electrostatic latent image, converting the latent image into a visible image. The powder or liquid may subsequently be transferred to a sheet of paper and suitably affixed to it so as to form a permanent print.

One method of exposing the photoconductive layer to light from a given image comprises scanning a lamp or lamps across a document to be copied, the image being projected onto the photoconductive surface by means of a suitable optical system. One system for achieving this is described in British Patent Specification 995,413 where lamps which expose successive portions of a document to the photosensitive surface as they are scanned slowly across the document, are mounted on a carriage. At the end of the scanning stroke, the lamps are quickly returned to their start position.

Figure 2:
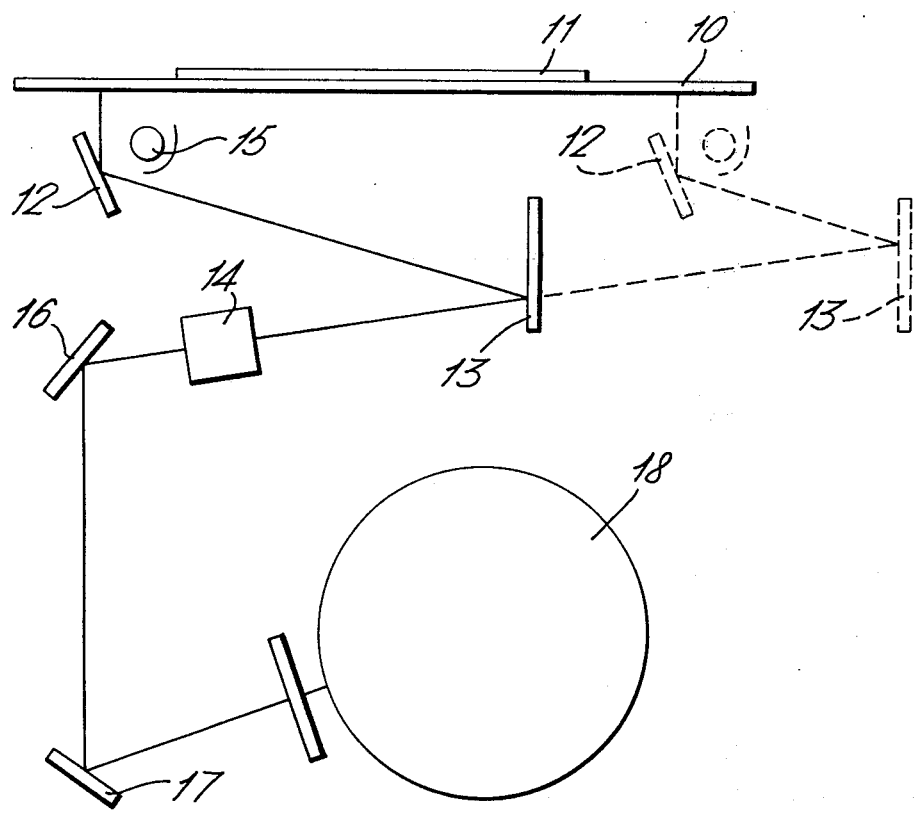
FIG. 2 illustrates the optical arrangement of the scanning system shown in FIG. 1.

The optical arrangement of the system shown in FIG. 1 is illustrated schematically in FIG. 2 and for clarity will be described first, it being noted that the views in FIGS. 1 and 2 are taken from the same side of the system. A platen 10 is provided to support a document 11 which is to be copied. A scanning mirror system includes two movable mirrors 12 and 13 shown in their extreme left and right hand positions (in FIG. 2) in full and dotted outline respectively. The mirror 13 is arranged to move at half the speed of the mirror 12 during scanning to maintain the optical distance constant between the document 11 and a lens 14. A tubular lamp 15 extending across the platen 10 parallel to the mirror 12 and in fixed relation to the latter moves with the mirror 12. The lamp 15 serves to illuminate the document through the platen 10 during scanning. An optical path extending from the platen 10 to the lens 14 continues beyond the lens to be reflected in sequence by mirrors 16 and 17 towards a photoreceptor drum 18. The photoreceptor may take other forms than a drum, e.g. it may be in the form of a belt or a photoconductive copy sheet.

Referring now to FIG. 1, the mirrors 12 and 13 are mounted respectively on carriages 21 and 22 which run on guide rods, tubes or the like 23 and 24 respectively. A common guide bar 25 is provided at the opposite sides of the carriages to support and stabilize the carriages. The carriage 21 also carries the lamp 15.

In FIG. 1 the carriages 21 and 22 are shown in their "start-of-scan" positions and during scanning they move from left to right.

The carriage 21 is driven by cable 26 via a capstan 27 mounted on a drive shaft 28 which is suitably driven from the main drive shaft of the machine through a timing belt 29 passing over a pulley 29a mounted fixedly on the capstan shaft 28, which belt also drives the photoreceptor drum. The movement of the carriage 21 is controlled by a single pulley and cable arrangement 30, 30' wherein the cable 30 extends between the carriage 1 and a fixed point on the machine frame over the pulley 30' which is mounted on the carriage 2. The cable 30 is held in tension by means of a secondary cable drive 31 from a smaller diameter capstan 31a attached to the capstan 27. As shown, the cable 31 is connected at its end opposite the capstan, to the carriage 2 and a tension spring 33 is interposed in the cable for tensioning. The drive capstan 27 is operatively connected to the shaft 28 during scanning by means of a clutch according to this invention (shown exploded in FIG. 1) which will be described below. During scanning a spring 34 connected between the capstan and a fixed point is loaded and provides the energy for returning the carriages to their start positions when the clutch is disengaged. For convenience the return of the carriages to their start-of-scan positions is termed "rescan".

In its start of scan position, the carriage 21 rests against an end stop or buffer 35 and at the end of the rescan stroke the carriage collides with this stop. In order to soften the collision and avoid damage to the system particularly the lamps, which are delicate, especially when hot, the velocity of the carriage 21 when it reaches the end stop is controlled by a suitable dashpot arrangement 36.

The embodiment of clutch shown in FIG. 1 (exploded view) is also illustrated schematically in FIGS. 3 and 4 and will now be described in detail. The clutch comprises an input element defined by a plate 41 fixedly mounted on the shaft 28 against rotation relative thereto and an output element defined by the capstan 27 itself which is also mounted on the shaft 28 but is rotatable relative to the latter. A pawl 42 of annular form is pivoted to the plate 41 and 43 and is biased by a tension spring 44 to the position shown in FIG. 4 in which drive face 42a of the pawl drivingly engages a drive pin 45 on the capstan 27. The spring 44 is connected between bosses 46 and 47 on the pawl 42 and plate 41 respectively. The boss 47 projects through a slot 48 in pawl 42 to permit the required pivoting movement of the pawl 42.

Figure 3:
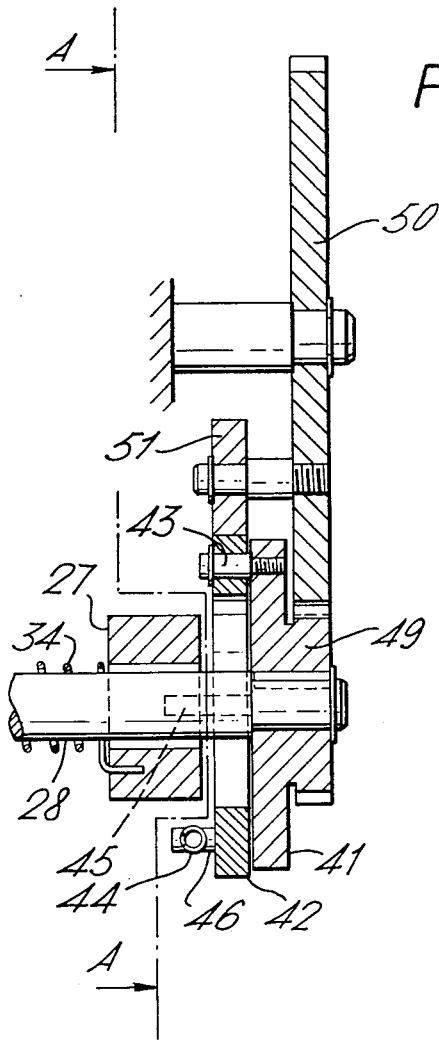
FIG. 3 is a section through an embodiment of clutch according to this invention.

With the pawl 42 in the position illustrated in FIG. 3, the clutch is engaged and, referring to FIG. 1, the capstan 27 is rotated to drive the carriages 1 and 2 in the scanning direction, the scanning movement of the carriages being synchronized with the rotation of the photoreceptor through the timing belt 29 which drives the shaft 28. In the drive arrangement illustrated, the capstan 27 is of lesser diameter than the photoreceptor drum and has to rotate through greater than one revolution in order to effect the required scanning movement of the carriages, before the clutch is disengaged. This is achieved, in accordance with the invention, in the following manner.

A gear 49 secured to the drive shaft, suitably being integral with the plate 41, meshes with a timing gear 50 mounted on the machine frame. The gear 50 carries a stop 51 defined by a roller which is adapted to engage the pawl 42, and effect release of the clutch one in each N revolutions of the shaft 28, where the diameter of timing gear 50 is N — times that of gear 49. In the embodiment illustrated N = 3. Upon release of the clutch, the capstan is rotated in reverse direction by the spring 34 to effect high speed rescan of the carriages 21 and 22.

It will be understood that during rescan, the capstan has to rotate in reverse direction through greater than one revolution where N = 2, through greater than two revolutions where N = 3, etc., and in order to permit this means must be provided to maintain the clutch disengaged for a sufficient length of time to avoid reengagement of pawl 42 and pin 45 before rescan has been completed. This is achieved in the embodiment illustrated by the stop engaging an external cam surface 52 on the pawl 42.

The operation of the clutch during one copy cycle of the machine will now be described. At the start of the cycle the clutch is engaged and the carriages 21 and 22 are in their start-of-scan positions. The belt drive 29 is started so as to rotate the photoreceptor drum and, through shaft 28 and the clutch, the capstan 27 to drive the carriages in the scanning direction. Each scanning cycle (which includes rescan) corresponds to N revolutions of the shaft 28 and accordingly the scan stroke of the carriages must be effected in less than N revolutions. Suitably, the carriages reach the ends of their scanning strokes, during which they move in synchronism with the photoreceptor, after N — ½ revolutions of the capstan 27 (and shaft 28), whereupon the clutch is disengaged by the stop 51 engaging the pawl 42 and disengaging drive face 42a from the capstan drive pin 45 to effect release of the clutch. During scanning the spring 34 is wound up by reason of its connection between capstan 27 and a fixed point. The capstan now rotates in reverse direction under the influence of the spring 6 through N — ½ revolutions to rescan the carriages, the pawl being held disengaged for sufficient time to permit this by cam surface 52. The time interval required is that for the cam to rotate through N — 1 revolutions after which the pin 45 cannot reengage the pawl drive surface 42a before rescan is completed. By suitable choice of the spring 34 and other factors determining the rescan speed of the carriages (e.g., the effect of the dashpot 36), the surface 52 may be shaped so as to be engaged by the stop 51 for less than half of a revolution of the plate 41. As the stop 51 runs off the end of surface 52, the pawl is returned to its drive engaging position by spring 44 and picks up drive pin 45 at the start of the next scanning stroke. Thus, the scanning cycle of N revolution of shaft 28 comprises a scanning stroke of N — ½ revolutions and rescan during the remaining half revolution.

FIGS. 5 and 6 show a modified form of the clutch described above in which the ratio of the gears 50 to 49 is 2:1 and the pawl 42 and stop 51 are of the modified configurations illustrated. The stop 51 and cam surface 52 are so dimensioned and shaped as to provide a smooth interaction therebetween so as to avoid jarring of the capstan 27, and thus the carriages, during operation of the clutch. At the same time since N = 2 it has been found that by suitable choice of the return spring for the capstan that the cam surface 52 need as illustrated correspond only to about an eighth of a revolution.

The angle between the drive engaging faces of the pawl 42 and stop 51 is chosen so as:

a. to transmit the required driving torque (e.g., 9 - 10 lb/ins.)

b. to limit the load required to disengage the clutch to an optimum low level (e.g., 2.4 lbs.), and c. to ensure the clutch automatically disengages once a prescribed drive torque is exceeded (e.g., 14.7 lb/ins.).

In this embodiment the outer edge of the pawl is cut away to receive the spring. Also, the pulley 29a over which the timing belt 29 passes is arranged at the end of shaft 28 adjacent the clutch and is secured to the clutch input element 41 by bolts 53.

Figure 4:
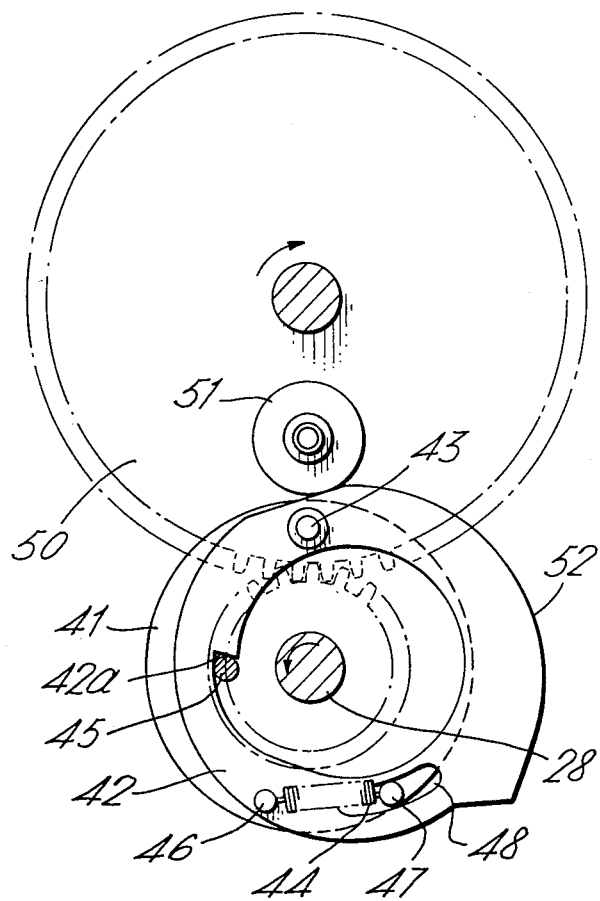
FIG. 4 is a section along the line A—A of FIG. 3.

Another modification introduced by this embodiment and which may also be incorporated in the embodiment described with reference to FIGS. 3 and 4 is to form the driving face 42a on an inward projection of the pawl 42 so as to define an opposed face 42b which ensures that if the carriages are pulled by hand along their scanning stroke, the drive pin 45 will be prevented from rotating through greater than a revolution relative to the pawl by the drive pin engaging the face 42b. In this way it is ensured that the capstan will always return to its rully unwound position when the carriages are released.

While particular embodiments of the invention have been described it will be appreciated that various modifications may be made to the specific details referred to herein without departing from the scope of the invention as defined in the appended claims.

For example the value of N may be different from those values described, depending on the size of the capstan and the length of the carriage scanning stroke.

Furthermore, although a scanning drive for the carriages is described which is effective through a capstan, it will be understood that other drive systems are envisaged within the scope of this invention. Also, while document scanning systems described above include two carriages, a different number of carriages, including a single carriage, may be provided.

What is claimed is:

1. A reproduction machine having a document scanning system, and an improved means for operating the latter, said means comprising:

a recycling clutch comprising rotatable input and output elements, cooperating drive engagement means on said elements respectively, one of which is pivotally mounted on its associated element and biased for engagement with the engagement means on the other element, a rotatable timing element adapted to be driven by said input element and arranged to come into engagement with said pivotally mounted engagement means to effect release of the clutch at intervals greater than a revolution of said input element, and said pivotally mounted engagement means having means defining a cam surface thereon engageable by said timing element for maintaining said engagement means disengaged for a sufficient length of time to permit rotation of the output element in reverse direction under the influence of a biasing means through greater than one revolution.

2. A reproduction machine as set forth in claim 1, wherein said input element includes a plate and wherein said output element includes a stop, and further including an annular pawl having a driving surface, said pawl being pivotally mounted to said plate and biased to a position in which said driving surface drivingly engages said stop.

3. A reproduction machine as set forth in claim 2, including a first gear fixed against rotation with respect to said plate, and wherein said timing element includes a second gear mounted so as to be driven by said first gear.

4. A reproduction machine as set forth in claim 2, wherein said output element includes a capstan, and further including a cable drive associated with said capstan.

5. A recycling clutch comprising rotatable input and output elements, cooperating drive engagement means on said elements respectively, one of which is pivotally mounted on its associated element and biased for engagement with the engagement means on the other element, a rotatable timing element adapted to be driven by said input element and arranged to come into engagement with said pivotally mounted engagement means to effect release of the clutch at intervals greater than a revolution of said input element, and said pivotally mounted engagement means having means defining a cam surface thereon engageable by said timing element for maintaining said engagement means disengaged for a sufficient length of time to permit rotation of the output element in reverse direction under the influence of a biasing means through greater than one revolution.

* * * * *